United States Patent [19]

Nakamura

[11] Patent Number: 4,582,899
[45] Date of Patent: Apr. 15, 1986

[54] MANUFACTURING METHOD FOR CELLULOSE ETHER HAVING HIGH DEGREE OF SUBSTITUTION

[75] Inventor: Hiroyuki Nakamura, Hyogo, Japan

[73] Assignee: Daicel Chemical Industries, Ltd., Osaka, Japan

[21] Appl. No.: 720,927

[22] Filed: Apr. 8, 1985

[30] Foreign Application Priority Data

Apr. 6, 1984 [JP] Japan ................... 59-68903

[51] Int. Cl.$^4$ ............... C08B 11/00; C08B 11/16; C08B 11/18; C08B 11/187
[52] U.S. Cl. ......................... 536/84; 536/93; 536/94
[58] Field of Search ............ 536/84, 76, 93, 94

[56] References Cited

U.S. PATENT DOCUMENTS

| | | | |
|---|---|---|---|
| 1,987,672 | 1/1935 | Ellsworth | 536/94 |
| 2,427,403 | 9/1947 | Haney et al. | 536/76 |
| 2,828,305 | 3/1958 | Mench et al. | 536/66 |
| 2,990,234 | 6/1961 | Klein et al. | 536/94 |
| 4,129,722 | 12/1978 | Iovine et al. | 536/84 |

Primary Examiner—Ronald W. Griffin
Attorney, Agent, or Firm—Sughrue, Mion, Zinn, Macpeak, and Seas

[57] ABSTRACT

A manufacturing method for cellulose ether having a high degree of substitution characterized in that an etherifying agent represented by a general formula RCH$_2$X (where R is aromatic group, heterocyclic group, vinyl group or ethynyl group or the same group substituted and X is chlorine or bromine) is reacted with a uniform solution of cellulose acetate having a degree of substitution of 2.0 and over in an organic solvent in the presence of a base to manufacture a highly substituted cellulose ether having a degree of substitution of 2.0 and over per anhydrous glucose unit by a one stage reaction at a good yield.

As a general method for manufacturing cellulose ether, a method for reacting an etherifying agent with alkali cellulose is now in use. For the general method, several improved methods have been proposed. However, it is difficult to manufacture cellulose ether having a degree of substitution of 2.5 and over by a one stage reaction using the general method. As manufacturing methods for cellulose ether other than the general method, a method for using a solvent-soluble cellulose derivative as the raw material and a method for using a special solvent in which cellulose is soluble were proposed. However, the former had a defect of a low yield and the latter had a defect of too long a reaction time.

9 Claims, 7 Drawing Figures

MANUFACTURING METHOD FOR CELLULOSE ETHER HAVING HIGH DEGREE OF SUBSTITUTION

FIELD OF THE INVENTION

The present invention relates to a manufacturing method for cellulose ethers having a high degree of substitution which is characterized in that an etherifying agent is reacted with cellulose acetate in its uniform solution in an organic solvent in the presence of a base in powdery form.

BACKGROUND OF THE INVENTION

As a method for manufacturing cellulose ethers, after cellulose is converted to alkali cellulose in the presence of water and a base, an etherifying agent is reacted with the alkali cellulose, which is the method now in general use (a method falling in this category is referred to as the general method hereinafter). In the general method, as an etherifying agent is consumed by water contained in an alkali cellulose, etherification of cellulose is often hindered or the etherification reaction often proceeds in a non-uniform system, so that it is impossible to manufacture cellulose ether having a high degree of substitution by a one step reaction.

As the general method carried out with the aim of manufacturing of cellulose ethers having a high degree of substitution or of improvement in the reaction efficiency of an etherifying agent, there can be cited (a) a multi-stage reaction method for reetherifying cellulose until an object etherification degree is obtained, (b) a multi-stage alkali addition method [Japanese Patent Laid-Open No. 45201/1983], (c) a method for combining multi-stage reactions with multi-stage alkali addition [Japanese Patent Laid-Open No. 176202/1983], (d) a method for adding additives such as a dispersion assistant and a catalyst transferring between phases to a reaction system[Japanese Patent Laid-Open No. 103501/1983], [W. H. Daly, J. D. Caldwell: Polymer Sci.:Polymer Letters Ed.,17, 55(1979)] and the like. The method (a) is a general method for manufacturing cellulose ethers having a high degree of sunstitution, but it is not an advantageous that the etherification reaction is carried out many times and the manufacturing cost is increased in it. Although the limit of substitution degree for carboxymethylation reaction by a usual method was 1.7-1.8, the substitution degree of 2.2 was attained by the method(b) using the same amount of reagent as the above, but a substitution degree exceeding 2.2 cannot be expected by the one stage reaction. As the method(c), carboxymethylation was carried out two times by the method(b) and CMC having a degree of substitution of 2.95 was obtained. Therefore, the method(c) is fairly more advantageous than the method(a) alone. In the method(d), it was disclosed that use of a quaternary ammonium salt as a catalyst transferring between phases for synthesis of benzyl cellulose resulted in a rapid progress of the benzylation reaction. However, the substitution degree of the resulting benzyl cellulose was 2.4 at utmost. Several methods and proposals as the general method have been presented so far, but it is yet difficult to manufacture cellulose ether having a degree of substitution of 2.5 and over by the one stage reaction.

As a cellulose ether having a high degree of substitution which is now available industrially, there can be cited ethyl cellulose having a degree of substitution of 2.5. However, cellulose ethers other than that are not manufactured industrially, so that their characteristics and applications are hardly opened up. Cellulose derivatives have various functions according to properties of substituent groups and, in addition, the structure of cellulose has hidden potentiality of imparting a high degree function to cellulose. For example, benzyl cellulose is known to have a softening point and also excellent electric characteristics, and recently it has been found that tribenzyl cellulose (having a degree of substitution of 3) has an excellent optically resolving ability for the optical isomer of physiological active compounds such as medicines, agricultural chemicals and foods[Japanese Patent Application No. 226527/1983]. Further, formation of liquid crystal as found with a cellulose derivative can be cited as one example of the said high degree function. On the other hand, cellulose derivatives having a substituent group with an unsaturated bond at the side chain have a high utilizing value as reactive cellulose derivatives. For example, cellulose allyl ether can be grafted easily with styrene or the like, and as cinnamyl cellulose has properties that it becomes insoluble to a solvent by exposure to light or heat, it can be expected to apply it to a heat curing coating or to a photoresist. However, when benzyl cellulose and cinnamyl cellulose are manufactured by the general method, that is, a method for reacting an etherifying agent with alkali cellulose, the etherification reaction does not proceed uniformly, so that the cellulose ether having good solublity in a solvent or a high degree of substitution is hard to prepare. That seems to be because the surface of cellulose fiber etherified at the beginning time of etherification reaction becomes a hydrophobic layer which cannot be swelled by the aqueous alkali solution and consequently the etherifying agent cannot penetrate into the inside of cellulose.

As the method for preparing benzyl cellulose having a high degree of substitution by a method other than the general method, there can be cited a method for using a solvent-soluble cellulose derivative as the raw material and a method for using a special solvent for dissolving cellulose. These methods are ones for attempting to solve difficulties of etherification reaction and non-uniformity in the same reaction caused by the shape of cellulose fiber by dissolving the raw material to prepare a uniform solution. As the method for using a cellulose derivative as the raw material, there can be cited a method for benzylating cellulose acetate by Hakomori's method[S. Hakomori: J. Biochem. (Tokyo), 35,205-208(1964)]. This is the benzylating method by dissolving cellulose monoacetate(having a degree of substitution of 1) as the raw material in dimethyl sulfoxide and then using dimsyl ions ($CH_3SOCH_2^-$) and benzyl chloride to benzylate the cellulose acetate[G. Keilich, N.Frank and E.Husemann: Makromol. Chem., 176, 3269(1975)]. Although benzyl cellulose having a degree of substitution of 2.95 was obtained by the method, its yield was as low as 30%. In the method for using a solvent for cellulose, after cellulose was dissolved in a solvent system consisting of $SO_2$, diethylamine and dimethyl sulfoxide, powdered sodium hydroxide was added to the solution and then divided addition of benzyl chloride was carried out for benzylation (A. Ishizu, A. Isogai, T. Ishii and J. Nakano: Paper contributed for International Symposium on Wood and Pulping Chemistry, Vol.1, 70(1983)). Benzyl cellulose having a degree of substitution of 3.0 was obtained at a high yield by the method. However, the method required a special solvent for dissolving cellulose and also the operation for dissolving cellulose was troublesome. In the method, when powdered sodium hydroxide was added to the cellulose solution, cellulose became an insoluble compound, which precipitated in the form of granule, so that the reaction system became once a non-uniform system. Therefore, as the benzylation reaction proceeded, the reaction product was dissolved in the solvent. However, completion of the reaction and formation of a uniform system took a long time. In the above-mentioned methods, the benzylation reaction was carried out under condition of considerably few amount of water as compared with the general method and also a good solvent for both raw cellulose and benzyl cellulose was used, so that uniformity of the reaction was improved and the benzyl cellulose product had a high degree of substitution. However, the methods had the defect such as a low yield or too long a reaction time( of 16–20 hours).

DETAILED DESCRIPTION OF THE INVENTION

Figure 1:
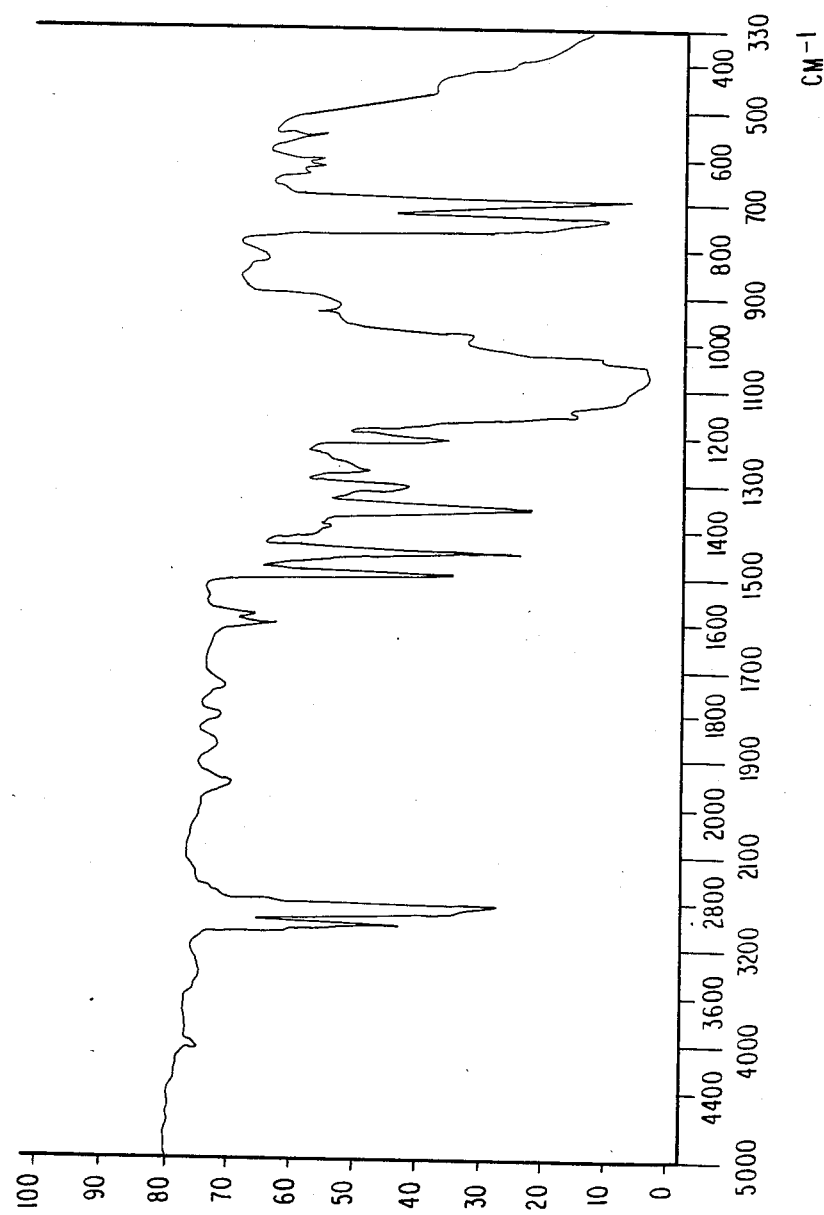
FIG. 1, FIG. 2, FIG. 3, FIG. 4, FIG. 5, FIG. 6, and FIG. 7 are infrared absorption spectra of benzyl cellulose, p-methylbenzyl cellulose, p-chlorobenzyl cellulose, p-methoxybenzyl cellulose, p-isopropylbenzyl cellulose, 1-naphthylmethyl cellulose, and cinnamyl cellulose, respectively.

The inventor devoted himself to studies on improvement of manufacturing method for cellulose ether in consideration of the above-mentioned defect of publicly known manufacturing methods for cellulose ether and, as a result, found a method for manufacturing cellulose ether having a high degree of substitution by a one stage reaction. Thus, he completed the present invention.

The invention provides a manufacturing method for cellulose ether having a high degree of substitution characterized in that an etherifying agent represented by a general formula RCH$_2$X (where R is aromatic group, heterocyclic group, vinyl group, or ethynyl group or the same group substituted and X is chlorine or bromine) is reacted with a uniform solution of cellulose acetate having a degree of substitution of 2.0 and over in an organic solvent in the presence of a base to manufacture highly substituted cellulose ether having a degree of substitution of 2.0 and over per anhydrous glucose unit by a one step reaction.

Cellulose acetate for use for the method of the invention has a degree of substitution of 2.0 and over, preferably 2.0–2.6. In particular, cellulose acetate having a degree of substitution of 2.3–2.5 is referred to as cellulose diacetate and it has excellent solubility in an organic solvent. Cellulose diacetate prepared by partial hydrolysis of a cellulose acetate now industrially available, that is, cellulose triacetate, has a low content of sulfur matter for a sulfuric acid group in it has been hydrolyzed sufficiently and futher it is soluble in an organic solvent, so that it can be used advantageously as a raw material for the manufacturing method of the invention. Further, the lower the sulfur matter content of cellulose acetate used, the more advantageous the cellulose acetate. For example, when cellulose acetate having a high content of sulfur matter due to insufficient neutralization and hydrolysis of sulfuric acid matter is used for the method of the invention, the yield of cellulose ether is very low and the good result is not obtained though the cause for that is not clear.

An organic solvent for use in the method of the invention is selected from solvents in which cellulose acetate and an etherifying agent are soluble. As the said organic solvent, there can be cited 1,4-dioxane, tetrahydrofuran, dimethyl sulfoxide, dimethyl formamide, dimethyl acetamide and the like. However, 1,4-dioxane and tetrahydrofuran are specially preferred because they are stable to etherifying agents. The amount of the solvent used is 4–20 parts by weight, preferably 7–10 parts by weight based on 1 part by weight of cellulose acetate.

A base for use in the method of the invention may be any Br$\phi$nsted base( alkali metal hydroxide, quaternary ammonium hydroxide, or the like) but it is preferably an alkali metal hydroxide such as potassium, sodium, or lithium hydroxide. Although an aqueous solution of base is used to convert cellulose to alkali cellulose in the general method, the use of the same aqueous solution is not preferred in the method of the invention because cellulose acetate uniformly dissolved in an organic solvent is rapidly made insoluble to the solvent by addition of the same aqueous solution. Therefore, in the invention, the base is used under condition of the nearly no presence of water. Whe an alkali metal hydroxide( such as potassium hydroxide or sodium hydroxide) is used as the base, it is advantageous to use it in the form of powdered alkali metal hydroxide prepared by pulverizing the solid hydroxide. The amount of alkali metal hydroxide used in 9–60 mols, preferably 11–45 mol per mol of cellulose acetate( per anhydrous glucose unit).

The etherifying agent for use in the method of the invention is represented by a general formula RCH$_2$X, where R represents aromatic group, heterocyclic group, vinyl group, or ethynyl group or the same group substituted and X represents a group to be eliminated, e.g., chlorine or bromine. As RCH$_2$X, compounds having the following structure can be cited.

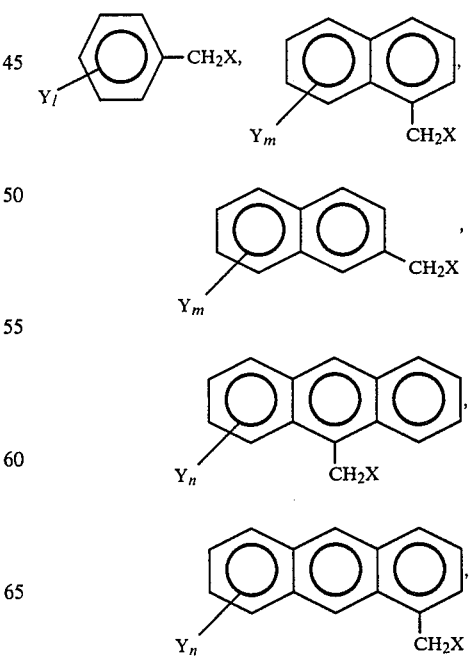

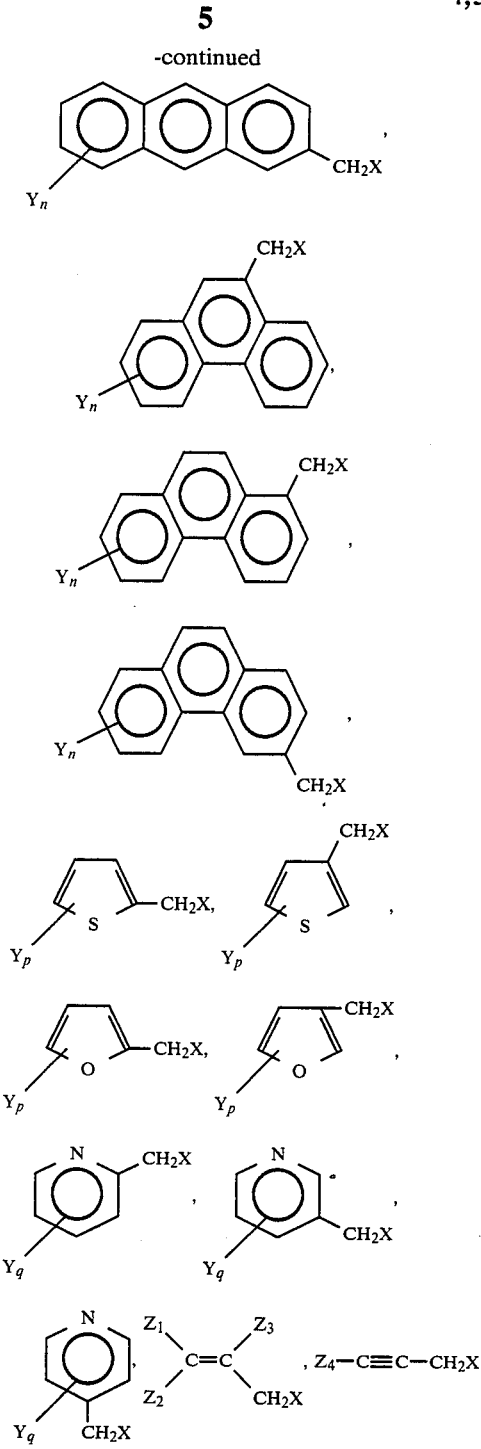

wherein Y is alkyl group, alkenyl group, alkynyl group, aromatic group, substituted aromatic group, heterocyclic group, substituted heterocyclic group, alkoxy group, nitro group, halogen, amino group, alkyl-substituted amino group, cyano group, hydroxyl group, or carboxyl group; l, m, n, p and g each represent the number of substituent groups, l is an integer of 0–5, m is 0–7, n is 0–9, p is 0–3 and g is 0–4; and $Z_1$, $Z_2$, $Z_3$ and $Z_4$ each are hydrogen, alkyl group, alkenyl group, alkynyl group, aromatic group, substituted aromatic group, heterocyclic group, substituted heterocyclic group, alkoxy group, or halogen. As the etherifying agent having an aromatic group as R, there can be cited benzyl chloride, p-methylbenzyl chloride, p-isopropylbenzy chloride, p-methoxybenzyl chloride, p-chlorobenzyl chloride, p-nitrobenzyl chloride,1-(chloromethyl) naphthalene, 9-(chloromethyl) anthracene, 10-chloro-9-(chloromethyl) anthracene, and the like. As the etherifying agent having a heterocyclic group as R, there can be cited furfuryl chloride,(2-thienyl)methyl chloride, 4-chloromethyl pyridine and the like. As the etherifying agent having a vinyl group as R, there can be cited allyl chloride, crotyl chloride, cinnamyl chloride, metallyl chloride, 2-bromo-3-chloro-1-propene, 2,3-dichloro-1-propene, 1,3-dichloropropene, 1,3-dichloro-2-methyl-1-propene, 1-chloro-2-methl-2-butene, 1-chloro-3-methyl-2-butene, 1-chloro-2,3-dimethyl-2-butene, 1-chloro-2-heptene, 1-chloro-4,4-dimethyl-2-pentene, and the like. As the etherifying agent having an ethynyl group as R, there can be cited propargyl chloride, 1-chloro-2-butyne, and the like. The amount of etherifying agent used in the method of the invention is 3–60 mols, preferably 6–36 mols per mol of cellulose acetate( per anhydrous glucose unit).

For executing the manufacturing method of the invention, first, dry cellulose acetate is dissolved in an organic solvent to prepare its uniform solution. In some organic solvents, cellulose acetate is difficult to dissolve completely for the solution becomes too viscous and in such a case, a solvent is heated to 50°–100° C. and cellulose acetate is completely dissolved in the solvent. After that, a base and an etherifying agent are added to the solution to etherify cellulose acetate. In this process, when such an etherifying agent as to generate a radical and cause easily an abnormal reaction like p-nitrobenzyl chloride is used, a radical catching agent such as cupric chloride or the like is added to restrain the abnormal reaction [N. Korublum, R. E. Michel, and R. C. Kerber, J.Am. Chem. Soc. 88,5662(1966)]. As adding order for reagents, usually after addition of a base, the total amount of etherifying agent is added. However, in some cases the total amount of a base is not added at the beginning but, after the etherifying agent is added and the etherification reaction is carried out for a prescribed time, the reaidual amount of the base is added to the reaction mixture. As addition method for reagents, besides, a method for divided addition of etherifying agent can also be carried out and in such a case, the optimum method for the type of cellulose ether to be manufactured is selected. In all cases, the reaction is carried out in a stream of inert gas such as nitrogen for removing oxygen in the reaction mixture and in the reactor. Dissolution and etherification of cellulose acetate are usually carried out under sufficient stirring, and the etherification reaction is carried out at 60°–120° C., preferably 90°–120° C. When cellulose acetate is dissolved, the resulting solution may be heated to a temperature required for the etherification and then a base and an etherifying agent may be added to the heated solution to start the etherification. However, after the solution of cellulose acetate is prepared and then a base and an etherifying agent are added to the solution, the solution may be heated to the temperature required for etherification. A reaction time required for the etherification is 3–10 hours. When the reaction is completed, the product is separated by an appropriate method. For example, after the product is cooled to a room temperature, it is extracted with chloroform. After the resulting solution of product in chloroform is washed, it is poured into a large volume of methanol to precipitate and separate cellulose ether product. The cellulose ether product is purified by reprecipitation, if necessary, and then after it is washed with a lower alcohol such as methanol, it is dried.

In the method of the invention, after cellulose acetate having a degree of substitution of 2.0 and more as the raw material is dissolved in an organic solvent to prepare a uniform solution, while the cellulose acetate is being saponified with a base, e.g., powdered alkali metal hydroxide, at the same time it is etherified with an etherifying agent, so that highly substituted cellulose ether can be manufactured at a good yield by the method of the invention in a shorter reaction time than a reaction time required in the conventional methods. In the method for dissolving cellulose in the solvent system and then for adding powdered sodium hydroxide to the resulting solution, cellulose precipitates again and the etherification reaction takes a long time. However, in the method of the invention, as cellulose acetate is used as the raw material, when the base is added, cellulose acetate does not become insoluble rapidly but while cellulose acetate is maintained at dissolved state or at least at dispersed or swelled state, its etherification reaction proceeds, and, as a result, uniformity of the reaction system is maintained well throughout the reaction. In the manufacturing method of the invention, main factors for controlling the degree of substitution of cellulose ether manufactured are the amount of a base and an etherifying agent added and a reaction time. If it is attempted to manufacture cellulose ether having a desired degree of substitution, it is possible to adjust the degree of substitution by controlling these factors appropriately.

Examples are shown for describing the invention in detail hereinafter. However, the invention is not limited to the examples. In the examples, parts mean parts by weight, and % meams % by weight. Further, the degree of substitution of cellulose ether product was determined from the content(%) of carbon measured by the elemental analysis of the product.

Example

EXAMPLE 1

5.0 parts of cellulose acetate [having a degree of substitution of 2.43 and a viscosity average polymerization degree of 170 which was determined by a formula $DP=[\eta]/Km$ taking the reduced viscosity of 0.2% solution of cellulose acetate in a dichloromethane-methanol mixed solvent (having a mixing ratio of 9:1) as $[\eta]$ and using $Km=8.73 \times 10^{-4}$, and being a product of daicel Chem. Ind. Ltd.] was thrown into 41.3 parts of dioxane, and the mixture was heated at about 100° C. for about 10 min under stirring and reflux to dissolve cellulose acetate completely. After that, 36.0 parts of powdered potassium hydroxide was added to the solution under stirring and subsequently, 51.7 prts of benzyl chloride was added gradually. After addition of benzyl chloride, the mixture was reacted at 100° C. for 8 hours under stirring. After completion of reaction, the reaction solution was cooled to a room temperature and then the product was extracted from the reaction solution with chloroform. The resulting chloroform solution was washed with an aqueous about 1 N hydrochloric acid and subsequently with water. After that, the chloroform solution was poured into methanol to precipitate the yellowish white product. The reaction product was washed with methanol before being dried. The product was benzyl cellulose[having the elemental analysis value of 74.75% of C and 6.54% of H] which has a degree of substitution of 2.9 and the yield of the product was 91%. The infrared absorption spectrum of benzyl cellulose obtained is shown in FIG. 1, and the wave-number and assignment of main absorption bands are mentioned hereinafter.

| (Wave-number) [cm$^{-1}$] | (Assignment) |
|---|---|
| 3100, 3070, 3040 | CH stretching vibration of phenyl group |
| near 2900 | CH$_2$ stretching vibration of benzyl group and of C$_6$ site of glucose skelton |
| 1960, 1870, 1810, 1750 | Overtone and combination tone of monosubstituted phenyl group |
| 1610(1585), 1500(1460) | Skelton vibration of phenyl group |
| near 1100 | Skelton vibration of pyranose ring |
| 740, 700 | CH out-of-plane deformation vibration of monosubstituted phenyl group |

EXAMPLE 2

Figure 2:
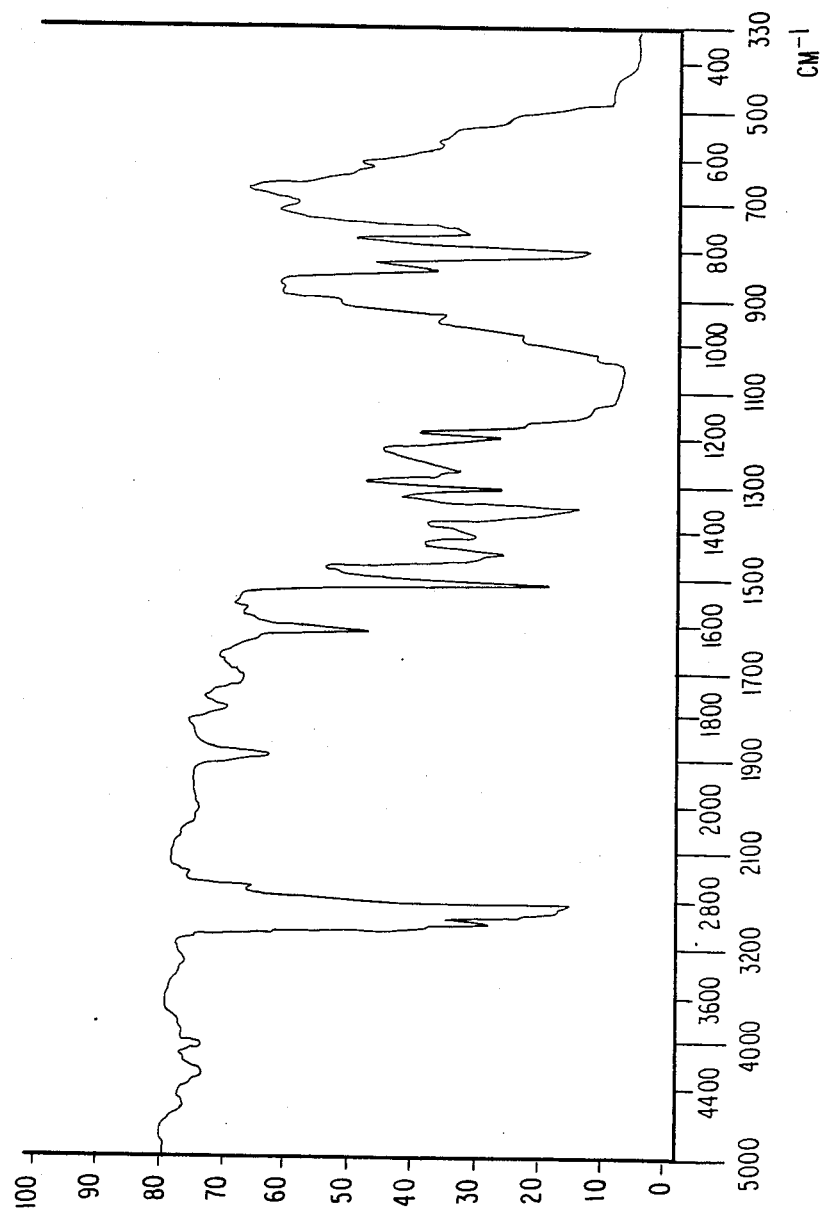

The same reaction and post-treatment as in Example 1 except using of 58.0 parts of p-methylbenzyl chloride instead of 51.7 parts of benzyl chloride were carried out. As a result, p-methylbenzyl cellulose[having the elemental analysis value of 75.66% of C and 7.25% of H] which had a degree of substitution of 2.9 was obtained at a yield of 80%. The infrared absorption spectrum of p-methylbenzyl cellulose obtained is shown in FIG. 2 and the wave-number and assignment of main absorption bands are mentioned hereinafter.

| (Wave-number) [cm$^{-1}$] | (Assignment) |
|---|---|
| 3100–3000 | CH stretching vibration of phenyl group |
| near 2900 | CH$_2$ stretching vibration of p-methylbenzyl group and of C$_6$ site of glucose skelton |
| 1900, 1800, 1730 | Overtone and combination tone of para substituted phenyl group |
| 1620(1580), 1520(1460) | Skelton vibration of phenyl group |
| 1460, 1380 | Deformation vibration of CH$_3$ |
| near 1100 | Skelton vibration of pyranose ring |
| 850, 810 | CH out-of-plane deformation vibration of para substituted phenyl group |

EXAMPLE 3

Figure 3:
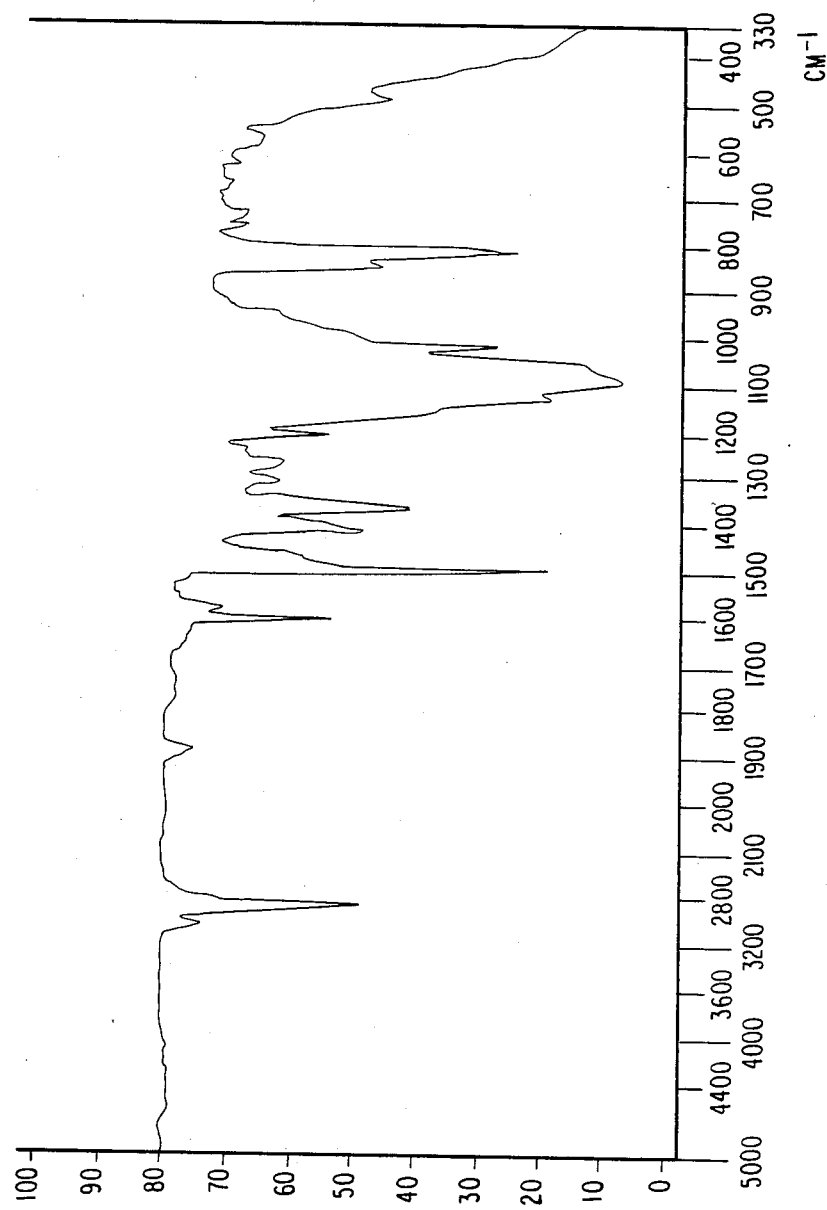

The same reaction and post-treatment as in Example 1 except using of 66.2 parts of p-chlorobenzyl chloride instead of 51.7 parts of benzyl chloride were carried out. As a result, p-chlorobenzyl cellulose[having the elemental analysis value of 60.49% of C and 4.76% of H] which had a degree of substitution of 3.0 was obtained at a yield of 86%. The infrared absorption spectrum of p-chlorobenzyl cellulose obtained is shown in FIG. 3 and the wave-number and assignment of main absorption bands are mentioned hereinafter.

| (Wave-number) [cm$^{-1}$] | (Assignment) |
|---|---|
| 3050 | CH stretching vibration of phenyl group |
| 2900 | CH$_2$ stretching vibration of p-chlorobenzyl group and of C$_6$ site of glucose skelton |
| 1900, 1800–1700 | Overtone and combination tone of para substituted phenyl group |
| 1600(1580), 1500(1460) | Skelton vibration of phenyl group |
| near 1100 | Skelton vibration of pyranose ring |

| (Wave-number)<br>[cm$^{-1}$] | (Assignment) |
| --- | --- |
| 850, 820 | CH out-of-plane deformation vibration of para substituted phenyl group |

EXAMPLE 4

Figure 4:
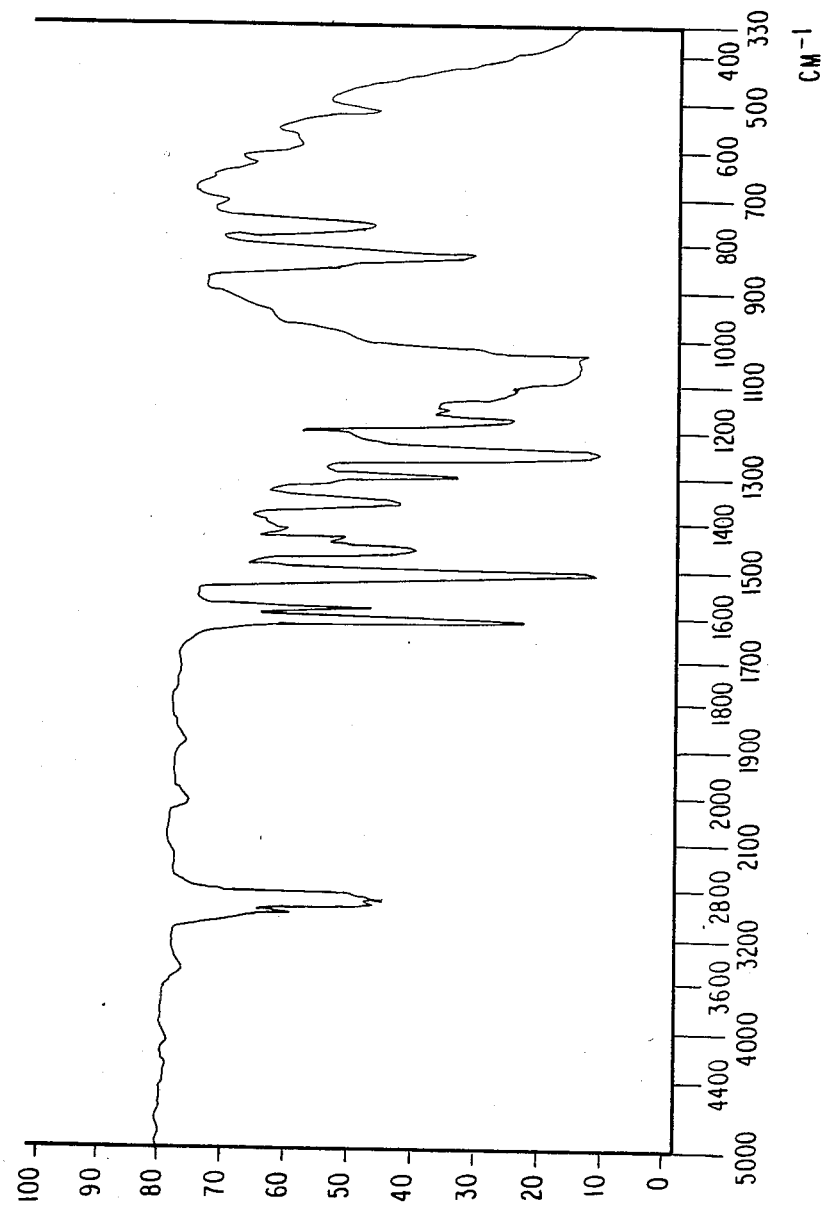

The same reaction and post-treatment as in Example 1 except using of 64.4 parts of p-methoxybenzyl chloride instead of 51.7 parts of benzyl chloride were carried out. As a result, p-methoxybenzyl cellulose [having the elemental analysis value of 68.45% of C and 6.55% of H] which had a degree of substitution of 2.8 was obtained at a yield of 75%. The infrared absorption spectrum of p-methoxybenzyl cellulose obtained is shown in FIG. 4 and the wave-number and assignment of main absorption bands are mentioned hereinafter.

| (Wave-length)<br>[cm$^{-1}$] | (Assignment) |
| --- | --- |
| 3100–3000 | CH stretching vibration of phenyl group |
| near 2900 | CH$_2$ stretching vibration of p-methoxybenzyl group and of C$_6$ site of glucose skelton |
| 1620,1590, 1520(1460) | Skelton vibration of phenyl group |
| 1250 | Inverse symmetrical stretching vibration of aromatic ring-OCH$_3$ |
| near 1100 | Skelton vibration of pyranose ring |
| 850, 820 | CH out-of-plane deformation vibration of para substituted phenyl group |

EXAMPLE 5

Figure 5:
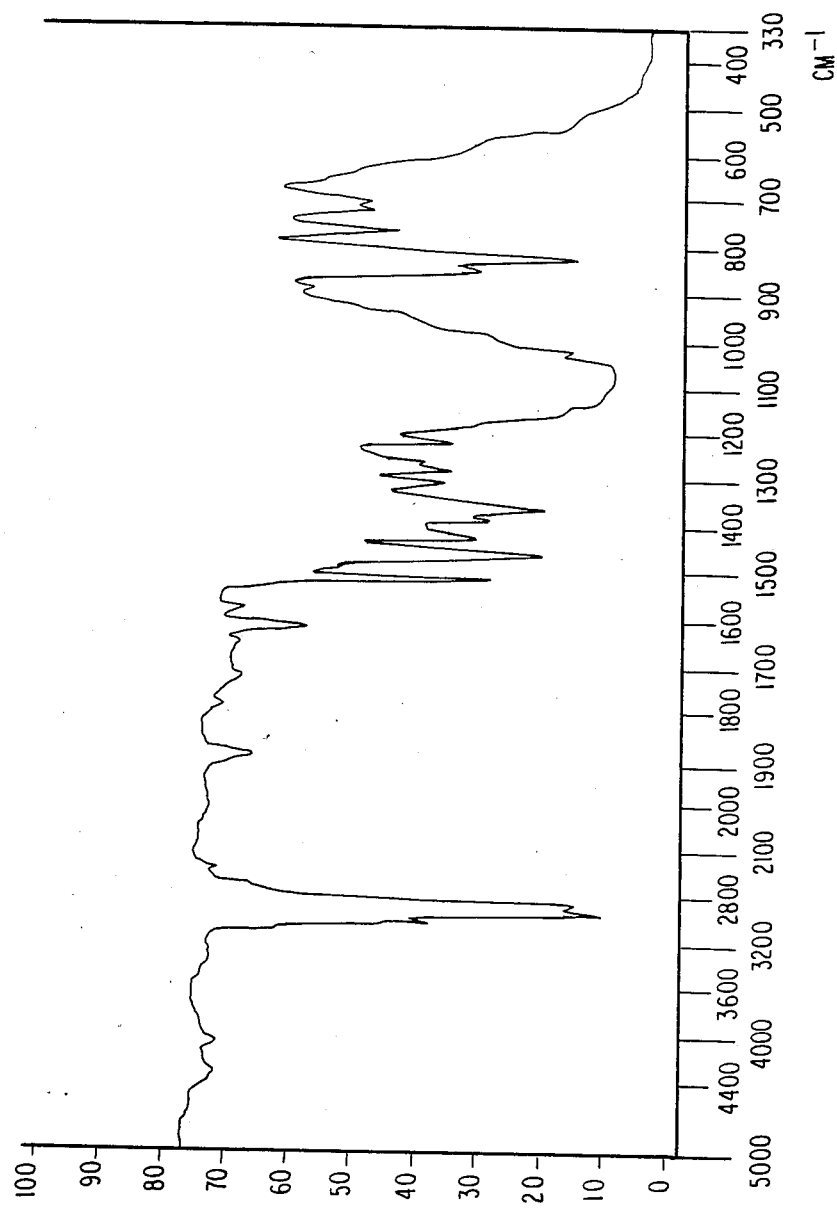

5.0 parts of cellulose acetate was dissolved in 41.3 parts of 1,4-dioxane as described in Example 1. After that, 36.0 parts of powdered potassium hydroxide was added to the solution under stirring, and subsequently 69.3 parts of p-isopropylbenzyl chloride was added to the solution gradually. The reaction was carried out at 100° C. under stirring. 20 parts of powdered potassium hydroxide and 60 parts of 1,4-dioxane were added to the reaction mixture 1 h after the addition of p-isopropylbenzyl chloride and then the reaction was further carried out at 100° C. for 9 hours. After completion of the reaction, the same posttreatment as in Example 1 was carried out. As a result, p-isopropylbenzyl cellulose [having the elemental analysis value of 77.21% of C and 8.34% of H] which had a degree of substitution of 2.9 was obtained at a yield of 86%. The infrared absorption spectrum of p-isopropylbenzyl cellulose obtained is shown in FIG. 5 and the wave-number and assignment of main absorption bands are mentioned hereinafter.

| (Wave-number)<br>[cm$^{-1}$] | (Assignment) |
| --- | --- |
| 3100, 3060, 3010 | CH stretching vibration of phenyl group |
| near 2900 | CH$_2$ stretching vibration of p-isopropylbenzyl group and of C$_6$ site of glucose skelton |
| 1900, 1800, (1730) | Overtone and combination tone of para substituted phenyl group |
| 1620(1580), 1520(1460) | Skelton vibration of phenyl group |
| 1380, (1360) | Skelton vibration of isopropyl group |
| near 1100 | Skelton vibration of pyranose ring |
| 850, 820 | CH out-of-plane deformation vibration of para substituted phenyl group |

EXAMPLE 6

Figure 6:
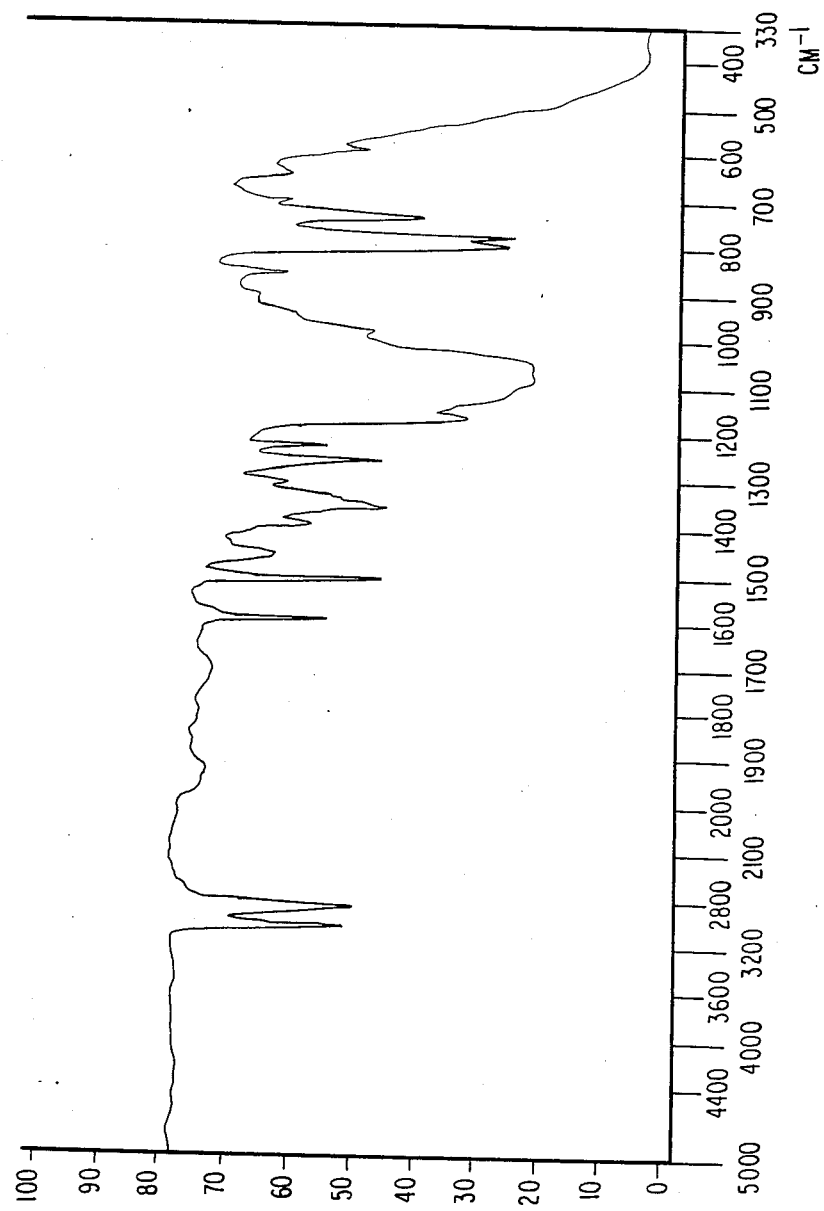

The same reaction and post-treatment as in Example 1 except changing the amount of 1,4-dioxane used from 41.3 parts to 100.0 parts and using of 72.6 parts of 1-chloro-mehtyl-naphthalene instead of 51.7 parts of benzyl chloride were carried out. As a result, 1-naphthylmethyl cellulose [having the elemental analysis value of 80.38% of C and 5.92% of H] which had a degree of substitution of 3.0 was obtained at a yield of 84%. The infrared absorption spectrum of 1-naphthylmethyl cellulose obtained is shown in FIG. 6 and the wave-number and assignment of main absorption bands are mentioned hereinafter.

| (Wave-number) [cm$^{-1}$] | (Assignment) |
| --- | --- |
| 3050 | CH stretching vibration of naphthalene group |
| near 2900 | CH$_2$ stretching vibration of 1-naphthylmethyl group and of C$_6$ site of glucose skelton |
| 1600, 1515(1460) | Skelton vibration of naphthalene group |
| near 1100 | Skelton vibration of pyranose ring |
| 800, 780 | CH out-of-plane deformation vibration of adjacent 3 H of naphthalene |
| 740 | CH out-of-plane deformation vibration of adjacent 4 H of naphthalene |

EXAMPLE 7

Figure 7:
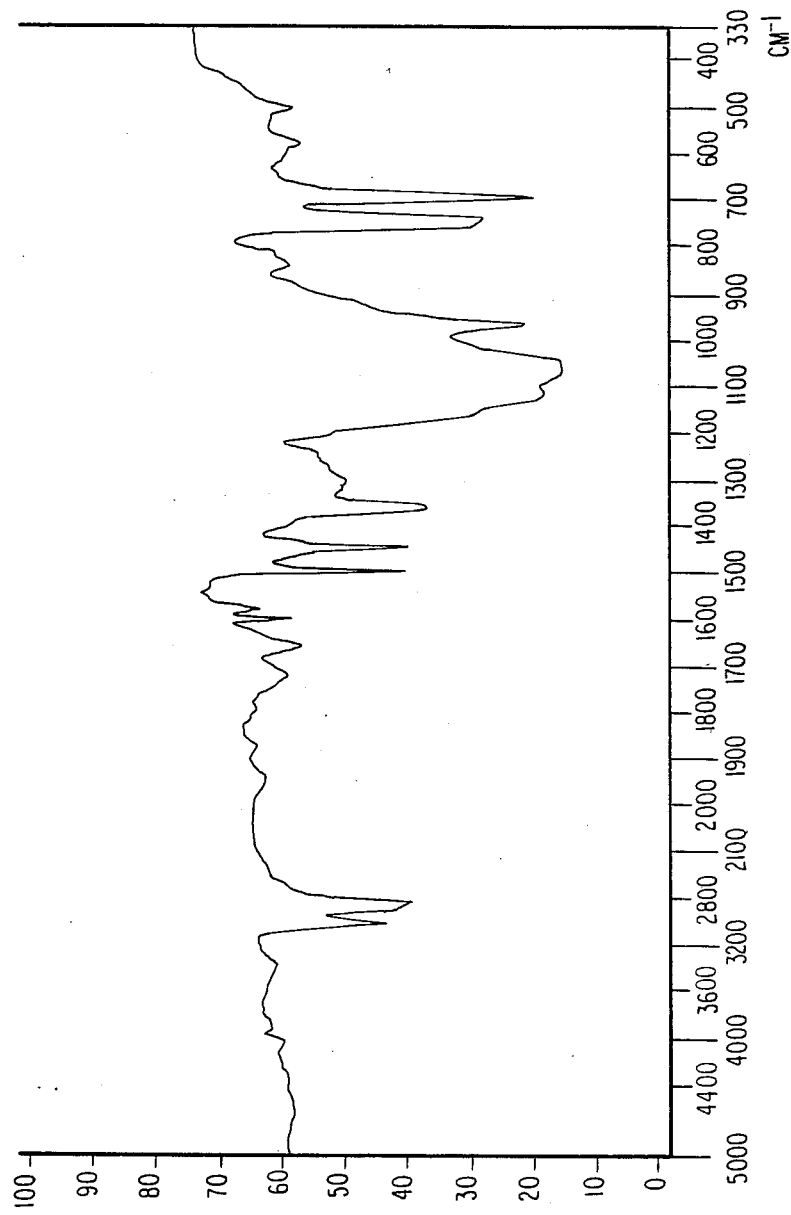

The same reaction and post-treatment as in Example 1 except using of 62.7 parts of cinnamyl chloride instead of 51.7 parts of benzyl chloride were carried out. As a result, cinnamyl cellulose [having the elemental analysis value of 76.80% of C and 6.71% of H] which had a degree of substitution of 2.8 was obtained at a yield of 87%. The infrared absorption spectrum of cinnamyl cellulose obtained is shown in FIG. 7 and the wave-number and assignment of main absorption bands are mentioned hereinafter.

| (Wave-number)<br>[cm$^{-1}$] | (Assignment) |
| --- | --- |
| 3100–3000 | CH stretching vibration of phenyl group |
| near 2900 | CH$_2$ stretching vibration of cinnamyl group and of C$_6$ site of glucose skelton |
| 1660 | C=C stretching vibration of cinnamyl group |
| 1600(1580), 1500(1450) | Skelton vibration of phenyl group |
| near 1100 | Skelton vibration of pyranose ring |
| 970 | CH out-of-plane deformation vibration of trans H of cinnamyl group |
| | 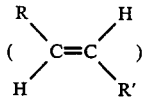 |
| 740, 700 | CH out-of-plane deformation vibration of monosubstituted phenyl group |

COMPARATIVE EXAMPLE

Comparative example 1

After 10 parts of purified cotton linter was swelling-treated in glacial acetic acid for 24 hours and over, the treated linter was squeezed to a total amount of 40 parts. To the swollen linter, a mixed acid having 2.0 parts of conc. sulfuric acid and 90 parts of acetic anhydride mixed with each other was added drop by drop and then the mixture was reacted under stirring at 40° C. for 5 hours. After completion of the reaction, the reaction solution was dropped into a large volume of water without performing of neutralization and hydrolysis of sulfuric acid and thus cellulose acetate (having a degree of substitution of about 3) was precipitated. The yield of the cellulose acetate was 96%. 5.0 parts of the thus obtained cellulose acetate were used for benzylation by the method as described in Example 1. As a result, benzyl cellulose [having the elemental analysis value of 74.56% of C and 6.52% of H] which had a degree of substitution of 2.9 was obtained at a yield of 53%. The reaction product was benzyl cellulose having a degree of substitution of 2.9, but it was brown and the yield of it was low as compared with Example 1.

While the invention has been described in detail and with reference to specific embodiments thereof, it will be apparent to one skilled in the art that various changes and modifications can be made therein without departing from the spirit and scope thereof.

What is claimed is:

1. A method for manufacturing a highly substituted cellulose ether which comprises dissolving cellulose acetate having a degree of substitution of at least 2.0 in an organic solvent and reacting an etherifying agent represented by a general formula $RCH_2X$ wherein R represents a substituted or unsubstituted aromatic group, a substituted or unsubstituted heterocyclic group, a substituted or unsubstituted vinyl group, or a substituted or unsubstituted ethynyl group, and X represents chlorine or bromine, with the cellulose acetate in the presence of a base to form a highly substituted cellulose ether.

2. A method as claimed in claim 1, wherein said organic solvent is one selected from 1,4-dioxane, tetrahydrofuran, dimethyl sulfoxide, dimethyl formamide, and dimethyl acetamide.

3. A method as claimed in claim 1, wherein said base is in powdery form.

4. A method as claimed in claim 1, wherein said cellulose acetate has a degree of substitution of from 2.3 to 2.5.

5. A method as claimed in claim 1, wherein said highly substituted cellulose ether has a degree of substitution of from 2.8 to 3.0.

6. A method as claimed in claim 1, wherein said highly substituted cellulose ether is obtained by one step reaction.

7. A method as claimed in claim 5, wherein said highly substituted cellulose ether is obtained by one step reaction.

8. A method as claimed in claim 1, wherein said base is potassium hydroxide.

9. A method as claimed in claim 3, wherein said base is potassium hydroxide.

* * * * *